United States Patent
Fang

(10) Patent No.: US 9,100,426 B1
(45) Date of Patent: Aug. 4, 2015

(54) SYSTEMS AND METHODS FOR WARNING MOBILE DEVICE USERS ABOUT POTENTIALLY MALICIOUS NEAR FIELD COMMUNICATION TAGS

(71) Applicant: Symantec Corporation, Mountain View, CA (US)

(72) Inventor: Ke Fang, Chengdu (CN)

(73) Assignee: Symantec Corporation, Mountain View, CA (US)

( * ) Notice: Subject to any disclaimer, the term of this patent is extended or adjusted under 35 U.S.C. 154(b) by 29 days.

(21) Appl. No.: 14/018,880

(22) Filed: Sep. 5, 2013

(51) Int. Cl.
*G06F 21/00* (2013.01)
*H04L 29/06* (2006.01)
*G06F 21/50* (2013.01)
*G06F 21/56* (2013.01)

(52) U.S. Cl.
CPC ............ *H04L 63/1416* (2013.01); *G06F 21/50* (2013.01); *G06F 21/56* (2013.01)

(58) Field of Classification Search
CPC ....... G06F 21/50; G06F 21/56; G06F 21/561; G06F 21/567
USPC .......................................... 726/22, 24, 25, 20
See application file for complete search history.

(56) References Cited

U.S. PATENT DOCUMENTS

| 7,868,761 | B2 * | 1/2011 | Grunwald et al. | 340/572.1 |
| 2012/0094597 | A1 * | 4/2012 | Tysowski | 455/41.1 |
| 2014/0154975 | A1 * | 6/2014 | Lambert et al. | 455/41.1 |

* cited by examiner

*Primary Examiner* — Edward Zee
(74) *Attorney, Agent, or Firm* — ALG Intellectual Proprty, LLC

(57) ABSTRACT

A computer-implemented method for warning mobile device users about potentially malicious NFC tags may include (1) obtaining, by a mobile device, NFC-tag information that identifies (i) a geo-location of at least one NFC tag and (ii) a result of at least one malware analysis performed on the NFC tag, (2) determining that the NFC tag includes potentially malicious content based at least in part on the result of the malware analysis performed on the NFC tag, (3) determining that the mobile device is located in proximity of the NFC tag based at least in part on the geo-location of the NFC tag, and then (4) providing an alert that warns a user of the mobile device against scanning the NFC tag due at least in part to the potentially malicious content included in the NFC tag. Various other methods, systems, and computer-readable media are also disclosed.

20 Claims, 6 Drawing Sheets

SYSTEMS AND METHODS FOR WARNING MOBILE DEVICE USERS ABOUT POTENTIALLY MALICIOUS NEAR FIELD COMMUNICATION TAGS

BACKGROUND

In recent years, some mobile technology developers have developed Near Field Communication (NFC) technologies that facilitate short-range communication between NFC-enabled mobile devices and unpowered NFC tags. These NFC tags may be programmed with messages that cause the NFC-enabled mobile devices to perform one or more automated tasks. For example, a user may direct his or her NFC-enabled mobile phone to scan an NFC tag presented in a public display (such as an advertising board and/or movie poster). In response to scanning this NFC tag, the NFC-enabled mobile phone may receive a message that causes the mobile phone to change one or more configuration settings, create and send one or more text messages, and/or launch one or more applications.

In addition to causing NFC-enabled mobile devices to perform innocuous automated tasks, NFC tags may also be programmed with messages that include potentially malicious content (such as a malicious executable and/or a link to a malicious website). In an effort to detect such content, some mobile technology developers may incorporate NFC security technologies that perform malware scans on messages received from NFC tags. Unfortunately, traditional NFC security technologies may still have one or more shortcomings and/or inefficiencies. For example, a traditional NFC security technology may be unable to warn a mobile device user about a potentially malicious NFC tag prior to scanning the NFC tag. Additionally or alternatively, the traditional NFC security technology may be unable to detect potentially malicious content included in a message received from an NFC tag that represents a zero-day threat.

As such, the instant disclosure identifies and addresses a need for systems and methods for warning mobile device users in advance about potentially malicious NFC tags.

SUMMARY

As will be described in greater detail below, the instant disclosure generally relates to systems and methods for warning mobile device users about potentially malicious NFC tags by obtaining NFC-tag information that identifies the geo-locations of such NFC tags.

In one example, a computer-implemented method for warning mobile device users about potentially malicious NFC tags may include (1) obtaining, by a mobile device, NFC-tag information that identifies (i) a geo-location of at least one NFC tag and (ii) a result of at least one malware analysis performed on the NFC tag, (2) determining that the NFC tag includes potentially malicious content based at least in part on the result of the malware analysis performed on the NFC tag, (3) determining that the mobile device is located in proximity of the NFC tag based at least in part on the geo-location of the NFC tag, and then (4) providing an alert that warns a user of the mobile device against scanning the NFC tag due at least in part to the potentially malicious content included in the NFC tag.

In some examples, the NFC-tag information may also identify a geo-location of at least one additional NFC tag and a result of at least one malware analysis performed on the additional NFC tag. In these examples, the method may also include determining that the additional NFC tag does not include malicious content based at least in part on the result of the malware analysis performed on the additional NFC tag. In such examples, the method may further include determining that the mobile device is located in proximity of the additional NFC tag based at least in part on the geo-location of the additional NFC tag. Additionally or alternatively, the method may include providing an alert that notifies the user of the mobile device that the additional NFC tag is safe to scan since the additional NFC tag does not include malicious content.

In some examples, the method may also include receiving an NFC message via NFC transmission from the additional NFC tag located in proximity of the mobile device. In such examples, the method may further include performing at least one malware analysis on the NFC message received from the additional NFC tag. Additionally or alternatively, the method may include providing at least one result of the malware analysis to a remote server. By providing the result of this malware analysis to the remote server, the method may enable the remote server to distribute the result of the malware analysis to at least one additional mobile device.

In some examples, the method may also include generating a hash of the NFC message. In such examples, the method may further include providing the hash of the NFC message to the remote server. By providing this hash of the NFC message to the remote server, the method may enable the remote server to monitor the NFC tag based at least in part on the hash.

In some examples, the method may also include identifying a computing payload (such as an executable and/or a uniform resource locator (URL) that identifies content stored on a remote device) within the NFC message received from the additional NFC tag. Additionally or alternatively, the method may include providing the computing payload identified within the NFC message to the remote server. By providing this computing payload to the remote server, the method may enable the remote server to perform at least one malware analysis on the computing payload and then distribute at least one result of this malware analysis to at least one additional mobile device.

In some examples, the NFC-tag information may also identify an additional geo-location where the additional NFC tag was previously scanned and a hash of the NFC message received from the additional NFC tag. In such examples, the method may also include determining that the additional NFC tag has been replaced by another NFC tag at the additional geo-location. For example, the method may include receiving an NFC message via NFC transmission from the other NFC tag currently located at the additional geo-location and generating a hash of the NFC message received from the other NFC tag currently located at the additional geo-location. The method may further include comparing the hash of the NFC message received from the other NFC tag currently located at the additional geo-location with the hash of the NFC message received from the additional NFC tag. Finally, the method may include determining that the hash of the NFC message received from the other NFC tag differs from the hash of the NFC message received from the additional NFC tag based at least in part on this comparison.

In some examples, the NFC-tag information may also identify a result of at least one malware analysis performed on the additional NFC tag and a timestamp used to identify a period of validity for this malware analysis. In such examples, the method may also include determining that the result of this malware analysis is still valid based at least in part on the timestamp. Additionally or alternatively, the method may include enabling the mobile device to scan the other NFC tag at the additional geo-location in response to determining that the result of this malware analysis is still valid.

In some examples, the method may also include performing at least one malware analysis on the NFC message received from the other NFC tag currently located at the additional geo-location. In such examples, the method may further include providing at least one result of this malware analysis to the remote server. By providing the result of this malware analysis to the remote server, the method may enable the remote server to distribute the result of the malware analysis to at least one other mobile device.

In some examples, the method may also include identifying a computing payload within the NFC message received from the other NFC tag currently located at the additional geo-location. In such examples, the method may further include providing this computing payload to the remote server. By providing this computing payload to the remote server, the method may enable the remote server to perform at least one malware analysis on the computing payload and then distribute at least one result of this malware analysis to at least one other mobile device.

In some examples, the result of the malware analysis performed on the NFC tag may include a result of at least one malware analysis performed on an additional instance of the NFC tag located at an additional geo-location.

In one embodiment, a system for implementing the above-described method may include (1) an obtainment module that obtains, by a mobile device, NFC-tag information that identifies (i) a geo-location of at least one NFC tag and (ii) a result of at least one malware analysis performed on the NFC tag, (2) a determination module that (i) determines that the NFC tag includes potentially malicious content based at least in part on the result of the malware analysis performed on the NFC tag and (ii) determines that the mobile device is located in proximity of the NFC tag based at least in part on the geo-location of the NFC tag, and (3) a provisioning module that provides an alert that warns a user of the mobile device against scanning the NFC tag due at least in part to the potentially malicious content included in the NFC tag.

In another embodiment, the above-described method may be encoded as computer-readable instructions on a computer-readable-storage medium. For example, a computer-readable-storage medium may include one or more computer-executable instructions that, when executed by at least one processor of a computing device, may cause the computing device to (1) obtain, by a mobile device, NFC-tag information that identifies (i) a geo-location of at least one NFC tag and (ii) a result of at least one malware analysis performed on the NFC tag, (2) determine that the NFC tag includes potentially malicious content based at least in part on the result of the malware analysis performed on the NFC tag, (3) determine that the mobile device is located in proximity of the NFC tag based at least in part on the geo-location of the NFC tag, and then (4) provide an alert that warns a user of the mobile device against scanning the NFC tag due at least in part to the potentially malicious content included in the NFC tag.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
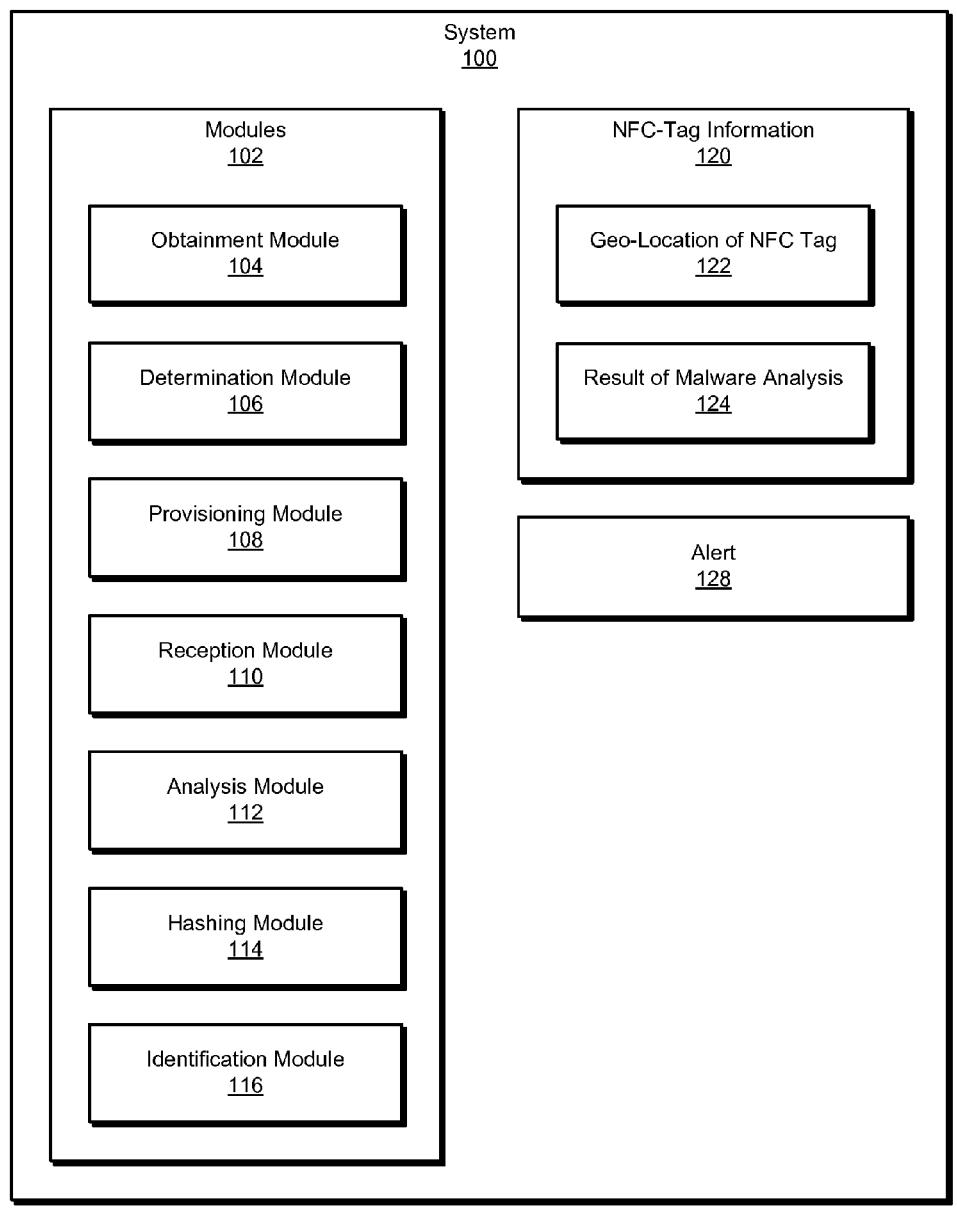
FIG. 1 is a block diagram of an exemplary system for warning mobile device users about potentially malicious NFC tags.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for warning mobile device users about potentially malicious NFC tags. As will be explained in greater detail below, by obtaining NFC-tag information that identifies a geo-location of at least one NFC tag and a result of at least one malware analysis performed on the NFC tag, the various systems and methods described herein may determine whether a mobile device is approaching a potentially malicious NFC tag. In the event that the mobile device is approaching a potentially malicious NFC tag, the various systems and methods described herein may provide an alert that warns a user of the mobile device against scanning the potentially malicious NFC tag. By providing this alert that warns the user against scanning the potentially malicious NFC tag, the various systems and methods described herein may enable the user to avoid (1) taking his or her time and/or resources to scan the potentially NFC tag and/or (2) subjecting his or her mobile device to a potential zero-day threat.

Figure 2:
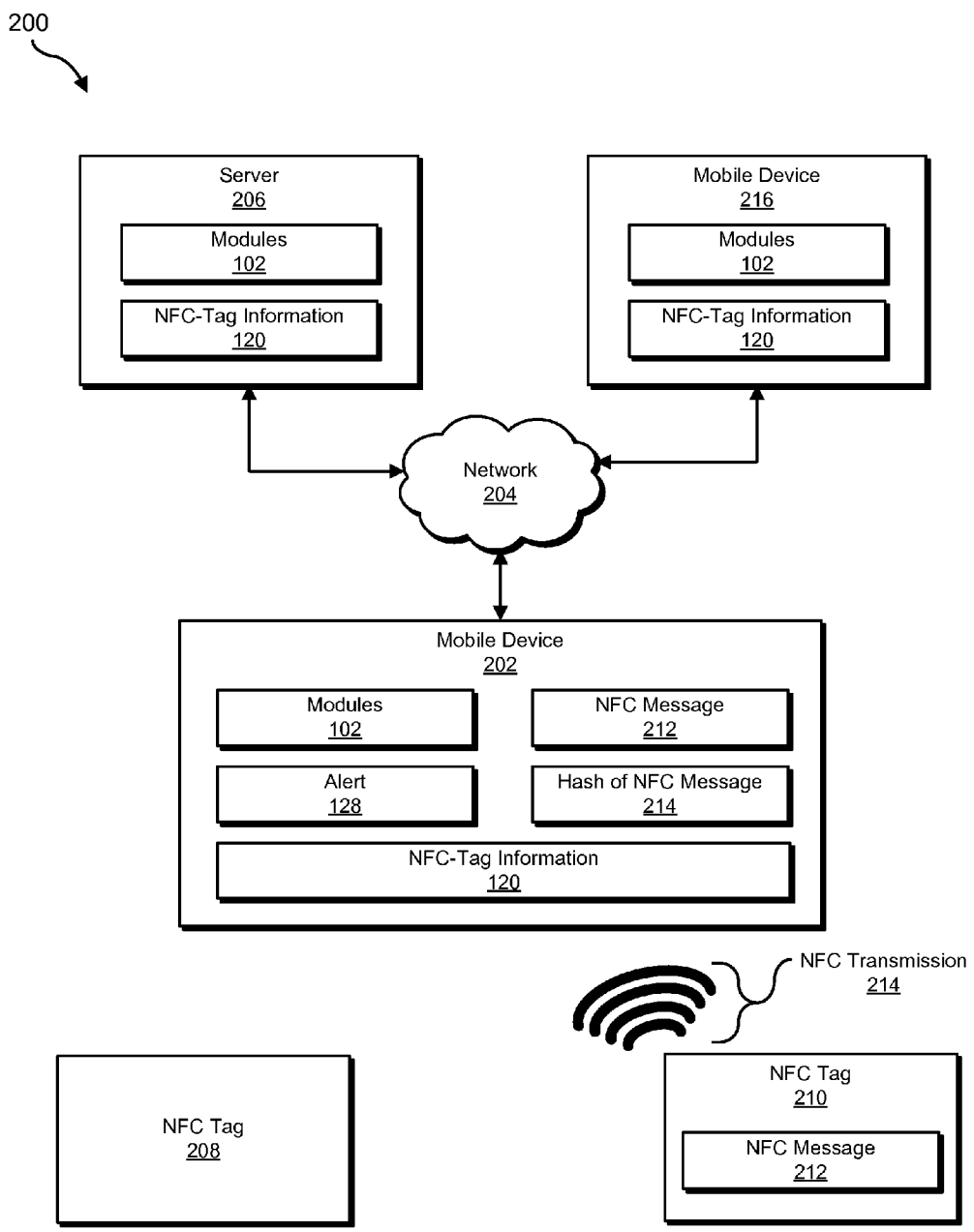
FIG. 2 is a block diagram of an exemplary system for warning mobile device users about potentially malicious NFC tags.

The following will provide, with reference to FIGS. 1-2, detailed descriptions of exemplary systems for warning mobile device users about potentially malicious Near Field Communication (NFC) tags. Detailed descriptions of corresponding computer-implemented methods will be provided in connection with FIG. 3. Detailed descriptions of an exemplary alert and an exemplary NFC message will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for warning mobile device users about potentially malicious Near Field Communication (NFC) tags. As illustrated in this figure, exemplary system 100 may include one or more modules 102 for performing one or more tasks. For example, and as will be explained in greater detail below, exemplary system 100 may include an obtainment module 104 that obtains NFC-tag information that identifies (1) a geo-location of at least one NFC tag and (2) a result of at least one malware analysis performed on the NFC tag. Exemplary system 100 may also include a determination module that (1) determines that the NFC tag includes potentially malicious content based at least in part on the result of the malware analysis performed on the NFC tag and (2) determines that the mobile device is located in proximity of the NFC tag based at least in part on the geo-location of the NFC tag.

In addition, and as will be described in greater detail below, exemplary system 100 may include a provisioning module 108 that provides an alert that warns a user of the mobile device against scanning the NFC tag due at least in part to the potentially malicious content included in the NFC tag. Exemplary system 100 may also include a reception module 110 that receives an NFC message via NFC transmission from an additional NFC tag located in proximity of the mobile device. Exemplary system 100 may further include an analysis module 112 that performs at least one malware analysis on the NFC message received from the additional NFC tag.

Moreover, and as will be described in greater detail below, exemplary system 100 may include a hashing module 114 that generates a hash of the NFC message received from the additional NFC tag. Exemplary system 100 may also include an identification module 116 that identifies a computing payload within the NFC message received from the additional NFC tag. Although illustrated as separate elements, one or more of modules 102 in FIG. 1 may represent portions of a single module or application (such as SYMANTEC's NORTON MOBILE SECURITY, MCAFEE MOBILE SECURITY, F-SECURE MOBILE SECURITY, BITDEFENDER MOBILE SECURITY, LOOKOUT MOBILE SECURITY, and/or KASPERSKY MOBILE SECURITY).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., mobile device 202, mobile device 216, and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include various data and/or information, such as NFC-tag information 120. In one example, NFC-tag information 120 may identify a geo-location 122 of at least one NFC tag. The term "geo-location," as used herein, generally refers to any type or form of identification and/or description of a geographic location. Geo-location 122 may include a set of geographic coordinates that specify the location of the NFC tag in terms of latitude, longitude, and/or elevation.

Additionally or alternatively, NFC-tag information 120 may include at least one result of malware analysis 124 performed on the NFC tag. The phrase "malware analysis," as used herein, generally refers to any type or form of scan and/or analysis that involves checking an NFC tag for potentially malicious content. Examples of such potentially malicious content include, without limitation, malware, computer viruses, bots, computer worms, malicious executables, Trojan horses, spyware, adware, URLs to one or more of the same, combinations of one or more of the same, or any other potentially malicious processes, commands, and/or code.

In some examples, the result of malware analysis 124 may indicate whether or not the NFC tag is potentially malicious. In one example, the result of malware analysis 124 may identify the NFC tag as potentially malicious. In another example, the result of malware analysis 124 may identify the NFC tag as safe and/or non-malicious.

Additionally or alternatively, the result of malware analysis 124 may identify a particular level of trustworthiness and/or suspicion for the NFC tag. In one example, the result of malware analysis 124 may indicate that the NFC tag's level of trustworthiness is relatively high, low, questionable, or unknown. In another example, the result of malware analysis 124 may indicate that the NFC tag's level of suspicion is relatively high, low, questionable, or unknown.

As illustrated in FIG. 1, exemplary system 100 may also include one or more alerts, such as alert 128. In one example, alert 128 may be configured to warn a mobile device user about a potentially malicious NFC tag. The term "alert," as used herein, generally represents any type or form of notice and/or communication presented to a mobile device user. Examples of alert 128 include, without limitation, display alerts, audio alerts, text-based alerts, haptic-based alerts, tactile-based alerts, combinations of one or more of the same, or any other suitable alert.

Exemplary system 100 in FIG. 1 may be implemented in a variety of ways. For example, all or a portion of exemplary system 100 may represent portions of exemplary system 200 in FIG. 2. As shown in FIG. 2, system 200 may include a server 206 in communication with mobile device 202 and/or mobile device 216 via a network 204. Server 206 may be programmed with one or more of modules 102 and/or may store all or a portion of NFC-tag information 120. Additionally or alternatively, mobile device 202 and/or mobile device 216 may be programmed with one or more of modules 102 and/or may store all or a portion of NFC-tag information 120.

As shown in FIG. 2, system 200 may also include one or more NFC tags, such as NFC tags 208 and 210. The phrase "NFC tag," as used herein, generally refers to any type or form of device, chip, and/or circuit capable of providing and/or facilitating delivery of data to one or more mobile devices. In one example, NFC tag 208 may be programmed to provide and/or facilitate delivery of potentially malicious content (not illustrated in FIG. 2).

Additionally or alternatively, NFC tag 210 may be programmed to provide and/or facilitate delivery of an NFC message 212 that does not include malicious content. The phrase "NFC message," as used herein, generally refers to any type or form of data, information, and/or communication stored and/or provided by an NFC tag. In one example, NFC message 212 may be formatted in an NFC Data Exchange Format (NDEF).

As shown in FIG. 2, mobile device 202 may also store alert 128, NFC message 212 received from NFC tag 210 via an NFC transmission 214, and/or hash 214 of NFC message 212. The term "hash," as used herein generally refers to any type or form of identifier that uniquely identifies an NFC tag and/or message. Examples of hash 214 include, without limitation, hashes, fingerprints, checksums, MD5 checksums, secure hash algorithms, digital signatures, references, pointers, combinations of one or more of the same, or any other suitable hash.

In one embodiment, one or more of modules 102 from FIG. 1 may, when executed by at least one processor of mobile device 202 and/or server 206, enable mobile device 202 and/or server 206 to warn a user of mobile device 202 about potentially malicious NFC tags. For example, and as will be described in greater detail below, one or more of modules 102 may cause mobile device 202 to (1) obtain NFC-tag information (such as NFC-tag information 120) that identifies (i) a geo-location (such as geo-location 122) of at least one NFC tag (such as NFC tag 208) and (ii) a result of at least one malware analysis (such as the result of malware analysis 124) performed on the NFC tag, (2) determine that the NFC tag includes potentially malicious content based at least in part on the result of the malware analysis, (3) determine that mobile device 202 is located in proximity of the NFC tag based at least in part on the geo-location of the NFC tag, and then (4) provide an alert (such as alert 128) that warns a user of mobile device 202 against scanning the NFC tag due at least in part to the potentially malicious content included in the NFC tag.

Mobile devices 202 and 216 generally represent any type or form of computing device capable of reading computer-executable instructions and/or scanning NFC tags. Examples of mobile devices 202 and 216 include, without limitation, cellular phones, smartphones, NFC-enabled devices, laptops, tablets, wearable computers, media players, multimedia players, gaming devices, digital camera devices, Personal Digital Assistants (PDAs), navigation devices, embedded systems, combinations of one or more of the same, exemplary computing system 510 in FIG. 5, or any other suitable mobile devices.

Server 206 generally represents any type or form of computing device capable of collecting, analyzing, and/or distributing NFC-tag information to mobile devices. Examples of server 206 include, without limitation, application servers, web servers, storage servers, deduplication servers, security servers, and/or database servers configured to run certain software applications and/or provide various web, storage, security, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication among server 206 and mobile devices 202 and 216.

Figure 3:
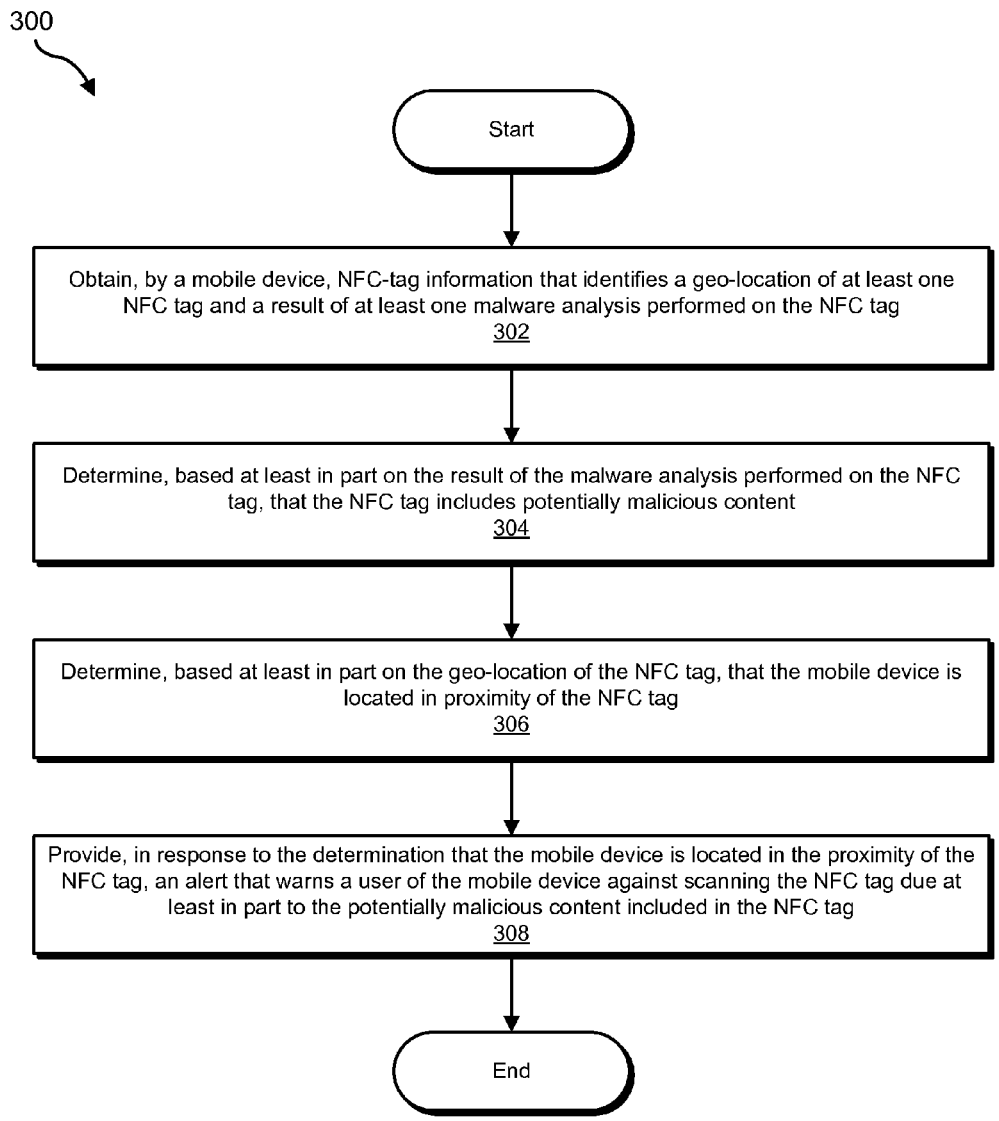
FIG. 3 is a flow diagram of an exemplary method for warning mobile device users about potentially malicious NFC tags.

FIG. 3 is a flow diagram of an exemplary computer-implemented method 300 for warning a user of mobile device 202 about potentially malicious NFC tags. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may obtain NFC-tag information that identifies a geo-location of at least one NFC tag and a result of at least one malware analysis performed on the NFC tag. For example, at step 302 obtainment module 104 may, as part of mobile device 202 in FIG. 2, obtain NFC-tag information 120 from server 206 via network 204. In this example, NFC-tag information 120 may identify geo-location 122 of NFC tag 208 in FIG. 2 and the result of malware analysis 124 performed on NFC tag 208.

The systems described herein may perform step 302 in a variety of ways. In some examples, server 206 may distribute NFC-tag information 120 to mobile device 202 based at least in part on the current location of mobile device 202. For example, obtainment module 104 may query a Global Positioning System (GPS) located on mobile device 202 for the current GPS coordinates of mobile device 202. Obtainment module 104 may then direct mobile device 202 to send the current GPS coordinates of mobile device 202 to server 206 via network 204.

Upon receiving the current GPS coordinates of mobile device 202, server 206 may retrieve and/or compile NFC-tag information 210 based at least in part on the current location of mobile device 202. For example, server 206 may generate NFC-tag information 120 that identifies all known NFC tags located within a particular range or distance of mobile device 202 (e.g., within the same city, state, and/or country as mobile device 202). In this example, server 206 may determine that NFC tag 208 is located within the particular range or distance of mobile device 202 by comparing the current GPS coordinates of mobile device 202 with geo-location 122 of NFC tag 208. As a result, server 206 may add geo-location 122 and the result of malware analysis 124 to NFC-tag information 120.

Server 206 may then send NFC-tag information 120 to mobile device 202 via network 204. As mobile device 202 receives NFC-tag information 120 from server 206, obtainment module 104 may obtain NFC-tag information 120.

In some examples, server 206 may distribute NFC-tag information 120 to mobile device 202 on a periodic basis. For example, a user of mobile device 216 in FIG. 2 may direct mobile device 216 to scan NFC tag 208. In response to this scanning of NFC tag 208, mobile device 216 may receive an NFC message from NFC tag 208 via NFC transmission. Upon receiving the NFC message from NFC tag 208, mobile device 216 may query an onboard GPS for the current GPS coordinates of mobile device 216 and then perform at least one malware analysis on the NFC message received from NFC tag 208. Finally, mobile device 216 may send at least one result of this malware analysis along with the geo-location of NFC tag 208 (based, e.g., at least in part on these GPS coordinates) to server 206 via network 204.

Upon receiving the result of this malware analysis along with the geo-location of NFC tag 208, server 206 may compile and/or update NFC-tag information 120 based at least in part on the result and geo-location. In one example, server 206 may generate NFC-tag information 120 that identifies the result of malware analysis 124 and geo-location 122 of NFC tag 208. In another example, server 206 may add the result of malware analysis 124 and geo-location 122 of NFC tag 208 to pre-existing NFC-tag information 120.

Server 206 may then send NFC-tag information 120 to mobile device 202 via network 204 in response to a predetermined event. Examples of such a predetermined event include, without limitation, a prescheduled time, completion of a compilation of NFC-tag information, completion of an update to NFC-tag information, combinations of one or more of the same, or any other suitable event. As mobile device 202 receives NFC-tag information 120 from server 206, obtainment module 104 may obtain NFC-tag information 120.

In a similar example, upon receiving the NFC message from NFC tag 208, mobile device 216 may query the onboard GPS for the current GPS coordinates of mobile device 216. Mobile device 216 may then send the NFC message received from NFC tag 208 along with the geo-location of NFC tag 208 (based, e.g., at least in part on these GPS coordinates) to server 206 via network 204.

Upon receiving the NFC message along with the geo-location of NFC tag 208, server 206 may perform at least one malware analysis on the NFC message. Server 206 may compile and/or update NFC-tag information 210 based at least in part on at least one result of the malware analysis and the geo-location of NFC tag 208. Server 206 may then send NFC-tag information 120 to mobile device 202 via network 204 in response to a predetermined event. As mobile device 202 receives NFC-tag information 120 from server 206, obtainment module 104 may obtain NFC-tag information 120.

In some examples, server 206 may distribute NFC-tag information 120 to mobile device 202 before mobile device 202 reaches the vicinity of NFC tag 208. For example, obtainment module 104 may initiate a request for NFC-tag information 120 and direct mobile device 202 to send this request to server 206 via network 204. In response to this request, server 206 may retrieve and/or compile NFC-tag information 120 that identifies the result of malware analysis 124 and geo-location 122 of NFC tag 208.

Server 206 may then send NFC-tag information 120 to mobile device 202 via network 204 even though mobile device 202 is not currently approaching NFC tag 208. As mobile device 202 receives NFC-tag information 120 from server 206, obtainment module 104 may obtain NFC-tag information 120.

In some examples, server 206 may distribute NFC-tag information 120 that identifies the result of at least one malware analysis performed on an additional instance of NFC tag 208. For example, the user of mobile device 216 in FIG. 2 may direct mobile device 216 to scan a duplicate of NFC tag 208 located at an additional geo-location. In response to this scanning of the duplicate NFC tag, mobile device 216 may receive an NFC message from the duplicate NFC tag via NFC transmission. Upon receiving the NFC message from the duplicate NFC tag, mobile device 216 may generate a hash of the NFC message received from the duplicate NFC tag and then perform at least one malware analysis on the NFC message. Finally, mobile device 216 may send at least one result of this malware analysis along with the hash of the duplicate NFC tag to server 206 via network 204.

Upon receiving the result of this malware analysis along with the hash of the duplicate NFC tag, server 206 may compile and/or update NFC-tag information 120 based at least in part on the result and hash. For example, server 206 may compare the hash of the duplicate NFC tag with a hash of NFC tag 208 uploaded by a different mobile device (not illustrated in FIG. 2). Server 206 may then determine that the NFC tag located at the additional geo-location is a duplicate of NFC tag 208 based at least in part on this comparison. Finally, server 206 may associate the result of the malware analysis performed on the duplicate NFC tag with geo-location 122 identified in NFC-tag information 120.

In some embodiments, NFC-tag information 120 may identify one or more additional attributes and/or characteristics (not illustrated in FIG. 1) of NFC tag 208. Additionally or alternatively, NFC-tag information 120 may identify one or more attributes and/or characteristics (not illustrated in FIG. 1) of one or more additional NFC tags (such as NFC tag 210 in FIG. 2 and/or other NFC tags not illustrated in FIG. 2). Examples of such attributes and/or characteristics include, without limitation, descriptions of the NFC tags, descriptions of the geo-locations of the NFC tags, digital images (such as photographs and/or video segments) of the NFC tags, digital images (such as photographs and/or video segments) of the geo-locations of the NFC tags, geo-locations of the NFC tags, results of malware analyses performed on the NFC tags, timestamps used to identify periods of validity for the malware analyses performed on the NFC tags, unique identifiers (such as hashes) that identify the NFC tags, alerts configured to warn users against scanning the NFC tags, combinations of one or more of the same, or any other suitable attributes and/or characteristics of NFC tags.

Returning to FIG. 3, at step 304 one or more of the systems described herein may determine that the NFC tag includes potentially malicious content based at least in part on the result of the malware analysis performed on the NFC tag. For example, at step 304 determination module 106 may, as part of mobile device 202 in FIG. 2, determine that NFC tag 208 includes potentially malicious content based at least in part on the result of malware analysis 124 performed on NFC tag 208. In this example, the result of malware analysis 124 may be included in NFC-tag information 120 obtained from server 206 via network 204.

The systems described herein may perform step 304 in a variety of ways. In some examples, determination module 106 may determine that NFC tag 208 includes potentially malicious content by parsing NFC-tag information 120. For example, determination module 106 may parse NFC-tag information 120 in search of at least one malware-analysis result indicative and/or suggestive of potentially malicious content. Upon parsing NFC-tag information 120, determination module 106 may identify the result of malware analysis 124 in NFC-tag information 120. Determination module 106 may then determine that the result of malware analysis 124 indicates and/or suggests that NFC tag 208 is potentially malicious.

In some examples, determination module 106 may be configured to assume and/or infer that NFC tag 208 includes potentially malicious content based at least in part on the level of trustworthiness and/or suspicion for NFC tag 208. For example, determination module 106 may parse the result of malware analysis 124 in search of the level of trustworthiness and/or suspicion for NFC tag 208. Upon parsing the result of malware analysis 124, determination module 106 may identify the level of trustworthiness and/or suspicion for NFC tag 208 in the result of malware analysis 124. Determination module 106 may then determine that the level of trustworthiness and/or suspicion for NFC tag 208 fails to satisfy a predetermined threshold. Finally, Determination module 106 may assume and/or infer that NFC tag 208 is potentially malicious since the level of trustworthiness and/or suspicion for NFC tag 208 fails to satisfy the predetermined threshold.

In some examples, determination module 106 may be configured to assume and/or infer that NFC tag 208 includes potentially malicious content in the event that the result of malware analysis 124 is no longer valid. For example, determination module 106 may parse NFC-tag information 120 in search of a timestamp used to identify a period of validity for the result of malware analysis 124. The term "timestamp," as used herein, generally refers to any type or form of time-based information related to an NFC tag. Examples of such a timestamp include, without limitation, the date and/or time that a malware analysis was performed on an NFC tag, the date and time that a result of a malware analysis becomes invalid and/or stale, the most recent date and/or time that a mobile device scanned an NFC tag, combinations of one or more of the same, or any other suitable time-based information related to an NFC tag.

Upon parsing NFC-tag information 120, determination module 106 may identify such a timestamp in NFC-tag information 120. Determination module 106 may then determine that the timestamp indicates and/or suggests that the result of malware analysis 124 is no longer valid. Finally, determination module 106 may assume and/or infer that NFC tag 208 is potentially malicious since the result of malware analysis 124 is no longer valid.

Returning to FIG. 3, at step 306 one or more of the systems described herein may determine that the mobile device is located in proximity of the NFC tag based at least in part on the geo-location of the NFC tag. For example, at step 306 determination module 106 may, as part of mobile device 202 in FIG. 2, determine that mobile device 202 is located in proximity of NFC tag 208 based at least in part on geo-location 122 of NFC tag 208. The term "proximity," as used herein, generally refers to any predetermined range or distance between a mobile device and an NFC tag.

The systems described herein may perform step 306 in a variety of ways. In some examples, determination module 106 may determine that mobile device 202 is located in proximity of NFC tag 208 by comparing the current location of mobile device 202 with geo-location 122. For example, determination module 106 may query the GPS located on mobile device 202 for the current GPS coordinates of mobile device 202. Upon querying the GPS for the current GPS coordinates of mobile device 202, determination module 106 may compare geo-location 122 of NFC tag 208 with these GPS coordinates. Determination module 106 may then determine that mobile device 202 is located within a predetermined range or distance of NFC tag 208 based at least in part on this comparison.

In some examples, determination module 106 may determine that mobile device 202 is approaching NFC tag 208 by monitoring the movement of mobile device 202 relative to geo-location 122. For example, determination module 106 may repeatedly query the GPS located on mobile device 202 in an effort to monitor the movement of mobile device 202 over a certain period of time. In response to these repeated queries, determination module 106 may receive multiple sets of GPS coordinates that collectively represent the movement of mobile device 202. Determination module 106 may then determine that mobile device 202 is approaching NFC tag 208 since these sets of GPS coordinates indicate that mobile device 202 is moving toward geo-location 122.

Returning to FIG. 3, at step 308 one or more of the systems described herein may provide an alert that warns a user of the mobile device against scanning the NFC tag due at least in part to the potentially malicious content included in the NFC tag. For example, at step 308 provisioning module 108 may, as part of mobile device 202 in FIG. 2, provide alert 128 to warn a user of mobile device 202 against scanning NFC tag 208 due at least in part to the potentially malicious content included in NFC tag 208. In this example, provisioning module 108 may initiate the process of providing alert 128 in response to the determination that mobile device 202 is located in proximity of NFC tag 208.

The systems described herein may perform step 308 in a variety of ways. In some examples, provisioning module 108 may generate alert 128 to warn the user of mobile device 202 against scanning NFC tag 208. In other examples, provisioning module 108 may retrieve alert 128 from NFC-tag information 120 obtained from server 206 via network 204.

In some examples, provisioning module 108 may direct mobile device 202 to present alert 128 to the user via at least one user interface of mobile device 202. Examples of such a user interface include, without limitation, monitors, displays, speakers, vibration motors, buttons, combinations of one or more of the same, or any other suitable user interface.

Figure 4:
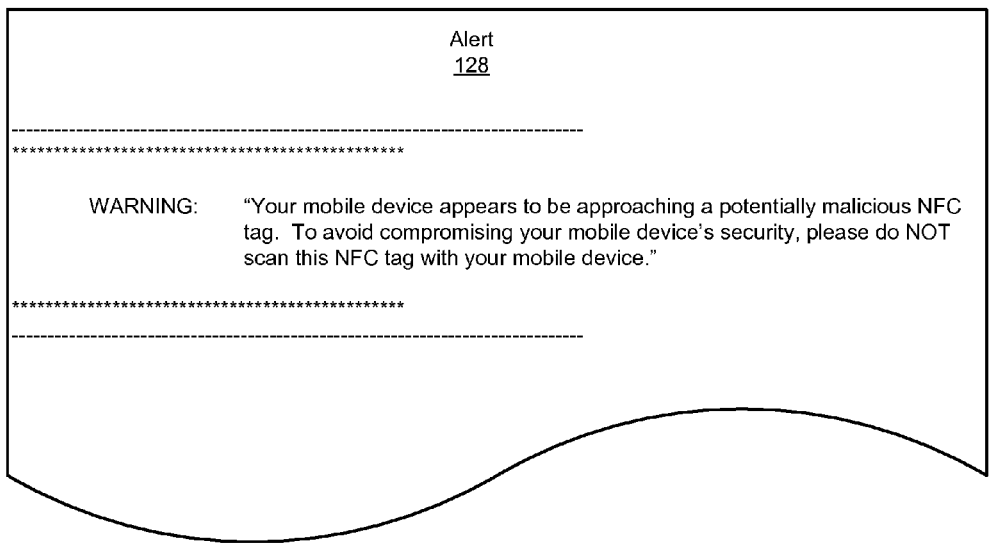
FIG. 4 is an illustration of an exemplary alert and an exemplary NFC message.
Figure 4:
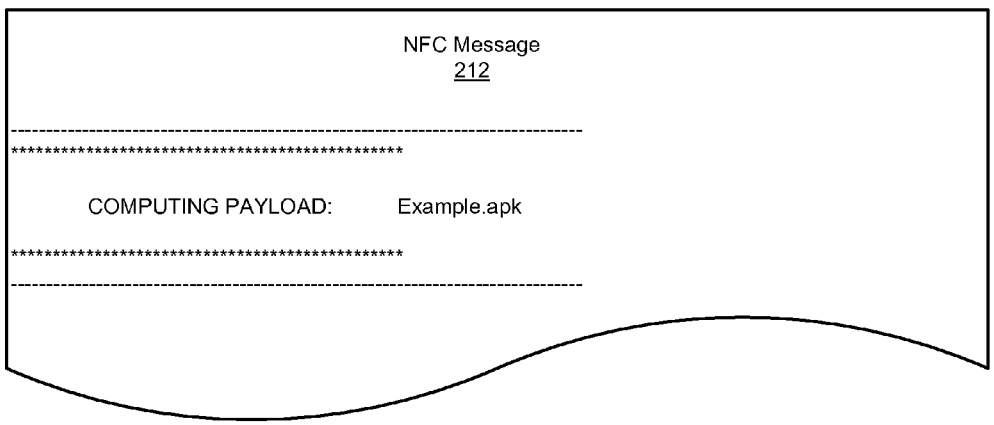

As shown in FIG. 4, alert 128 may include a text-based warning (in this example, "Your mobile device appears to be approaching a potentially malicious NFC tag. To avoid compromising your mobile device's security, please do NOT scan this NFC tag with your mobile device"). Alert 128 may also describe and/or identify NFC tag 208 using various other details (not illustrated in FIG. 4). Examples of such details include, without limitation, descriptions of the NFC tag, descriptions of the geo-location of the NFC tag, digital images (such as photographs and/or video segments) of the NFC tag, digital images (such as photographs and/or video segments) of the geo-locations of the NFC tag, directions to the geo-location of the NFC tag, combinations of one or more of the same, or any other details about the potentially malicious NFC tag.

Method 300 may also include one or more additional steps (not illustrated in FIG. 3). In some examples, one or more of the systems described herein may provide an alert that notifies the user of the mobile device that an NFC tag is safe and/or non-malicious. For example, the user of mobile device 216 in FIG. 2 may direct mobile device 216 to scan NFC tag 210. In response to this scanning of NFC tag 210, mobile device 216 may receive NFC message 212 in FIG. 2 from NFC tag 210 via NFC transmission. Upon receiving NFC message 212 from NFC tag 210, mobile device 216 may query an onboard GPS for the current GPS coordinates of mobile device 216 and then perform at least one malware analysis on NFC message 212 received from NFC tag 210. Finally, mobile device 216 may send at least one result of this malware analysis along with the geo-location of NFC tag 210 (based, e.g., at least in part on these GPS coordinates) to server 206 via network 204.

Upon receiving the result of this malware analysis along with the geo-location of NFC tag 210, server 206 may compile and/or update NFC-tag information 120 based at least in part on the result and geo-location. For example, server 206 may add the result of this malware analysis and the geo-location of NFC tag 210 to NFC-tag information 120. Server 206 may then send NFC-tag information 120 to mobile device 202 via network 204 in response to a predetermined event.

As mobile device 202 receives NFC-tag information 120 from server 206, determination module 106 may determine that NFC tag 210 does not include malicious content based at least in part on the result of this malware analysis. Determination module 106 may also determine that mobile device 202 is located in proximity of NFC tag 210 based at least in part on the geo-location of NFC tag 210. In response to this determination that mobile device 202 is located in proximity of NFC tag 210, provisioning module 108 may provide an alert that notifies the user of mobile device 202 that NFC tag 210 is safe to scan since NFC tag 210 does not include malicious content.

In some examples, one or more of the systems described herein may perform at least one malware analysis on an NFC tag and then provide at least one result of this malware analysis to a remote server. For example, the user of mobile device 202 may direct mobile device 202 to scan NFC tag 210. In response to this scanning of NFC tag 210, reception module 110 may, as part of mobile device 202 in FIG. 2, receive NFC message 212 from NFC tag 210 via NFC transmission 214 in FIG. 2.

NFC message 212 may include a computing payload (such as an executable or a URL that identifies content stored on a remote device). For example, as illustrated in FIG. 4, NFC message 212 may include an executable computing payload (in this example, "Example.apk").

Upon reception of NFC message 212 from NFC tag 210, analysis module 112 may, as part of mobile device 202 in FIG. 2, perform at least one malware analysis on NFC message 212 received from NFC tag 210. For example, analysis module 112 may perform a malware analysis on the "Example.apk" computing payload included in NFC message 212. Provisioning module 108 may then send at least one result of this malware analysis to server 206 via network 204. By providing the result of this malware analysis to server 206, provisioning module 108 may enable server 206 to distribute the result to at least one additional mobile device (not illustrated in FIG. 2).

In one example, hashing module 114 may, as part of mobile device 202 in FIG. 2, generate hash 214 of NFC message 212 received from NFC tag 210. In response to the generation of hash 214 of NFC message 212, provisioning module 108 may provide hash 214 to server 206 via network 204. By providing hash 214 to server 206, provisioning module 108 may enable server 206 to monitor NFC tag 210 (as well as duplicates of NFC tag 210) based at least in part on hash 214.

In some examples, one or more of the systems described herein may identify a computing payload within an NFC message received from an NFC tag and then provide this computing payload to the remote server. For example, identification module 116 may, as part of mobile device 202 in FIG. 2, identify the "Example.apk" executable as the computing payload within NFC message 212.

Provisioning module 108 may then send this computing payload to server 206 via network 204. By providing this computing payload to server 206, provisioning module 108 may enable server 206 to perform at least one malware analysis on the computing payload and then distribute at least one result of this malware analysis to at least one additional mobile device (not illustrated in FIG. 2).

In some examples, one or more of the systems described herein may determine that an NFC tag has been replaced by another NFC tag. For example, the user of mobile device 202 may direct mobile device 202 to scan a replacement NFC tag (not illustrated in FIG. 2) at the same geo-location where NFC tag 210 was previously scanned by mobile device 216. In response to this scanning of the replacement NFC tag, reception module 110 may receive an NFC message from the replacement NFC tag via NFC transmission. Upon receiving this NFC message from the replacement NFC tag, hashing module 114 may generate a hash of this NFC message and then compare this hash with hash 214 of NFC message 212 received from NFC tag 210. Finally, determination module 106 may determine that NFC tag 210 has been replaced by the replacement NFC tag since this hash differs from hash 214.

In some examples, one or more of the systems described herein may enable the mobile device to scan the replacement NFC tag in the event that the result of the malware analysis performed on the original NFC tag is still valid. For example, prior to reception of the NFC message from the replacement NFC tag, determination module 106 may determine that the result of the malware analysis performed on NFC message 212 is still valid based at least in part on the timestamp identified in NFC-tag information 120. In response to this determination that the result of the malware analysis performed on NFC message 212 is still valid, provisioning module 108 may enable mobile device 202 to scan the replacement NFC tag currently located at the geo-location where NFC tag 210 was previously scanned by mobile device 216. Additionally or alternatively, provisioning module 108 may provide an alert that notifies the user of mobile device 202 that the replacement tag appears to be safe and/or non-malicious.

In one example, analysis module 112 may perform at least one malware analysis on the NFC message received from the replacement NFC tag currently located at the geo-location where NFC tag 210 was previously scanned by mobile device 216. Upon performing this malware analysis on the NFC message, provisioning module 108 may provide at least one result of this malware analysis to server 206 via 204. By providing the result of this malware analysis to server 204, provisioning module 108 may enable server 206 to distribute the result of the malware analysis to at least one other mobile device (not illustrated in FIG. 2).

In another example, identification module 116 may identify a computing payload (such as an executable or a URL that identifies content stored on a remote device) within the NFC message received from the replacement NFC tag. Provisioning module 108 may then send this computing payload to server 206 via network 204. By providing this computing payload to server 206, provisioning module 108 may enable server 206 to perform at least one malware analysis on the computing payload and then distribute at least one result of this malware analysis to at least one other mobile device (not illustrated in FIG. 2).

In some examples, one or more of the systems described herein may prevent the mobile device from scanning the replacement NFC tag in the event that the result of the malware analysis performed on the additional NFC tag is no longer valid. For example, determination module 106 may determine that the result of the malware analysis performed on NFC message 212 is no longer valid based at least in part on the timestamp identified in NFC-tag information 120. In response to this determination that the result of the malware analysis performed on NFC message 212 is no longer valid, provisioning module 108 may prevent mobile device 202 from scanning the replacement NFC tag currently located at the geo-location where NFC tag 210 was previously scanned by mobile device 216. Additionally or alternatively, provisioning module 108 may provide an alert that notifies the user of mobile device 202 that the level of trustworthiness and/or suspicion for the replacement NFC tag is questionable or unknown.

As explained above in connection with method 300 in FIG. 3, an NFC security technology installed on a mobile device may provide an alert that warns the device's user against scanning a potentially malicious NFC tag. For example, the user may be approaching an advertising board and/or movie poster in a public place. As the user approaches the advertising board and/or movie poster, the NFC security technology may direct the mobile device to download (from, e.g., the Internet) NFC-tag information that identifies a potentially malicious NFC tag presented in the advertising board and/or movie poster. The NFC security technology may then determine that this NFC tag is potentially malicious based at least in part on the NFC-tag information.

In response to this determination that the NFC tag is potentially malicious, the NFC security technology may generate an alert that warns the user against scanning the potentially malicious NFC tag. The NFC security technology may then direct the mobile device to provide this alert to the user. By providing this alert to the user, the NFC security technology may enable the user to avoid (1) taking his or her time and/or resources to scan the potentially NFC tag and/or (2) subjecting his or her mobile device to a potential zero-day threat.

Figure 5:
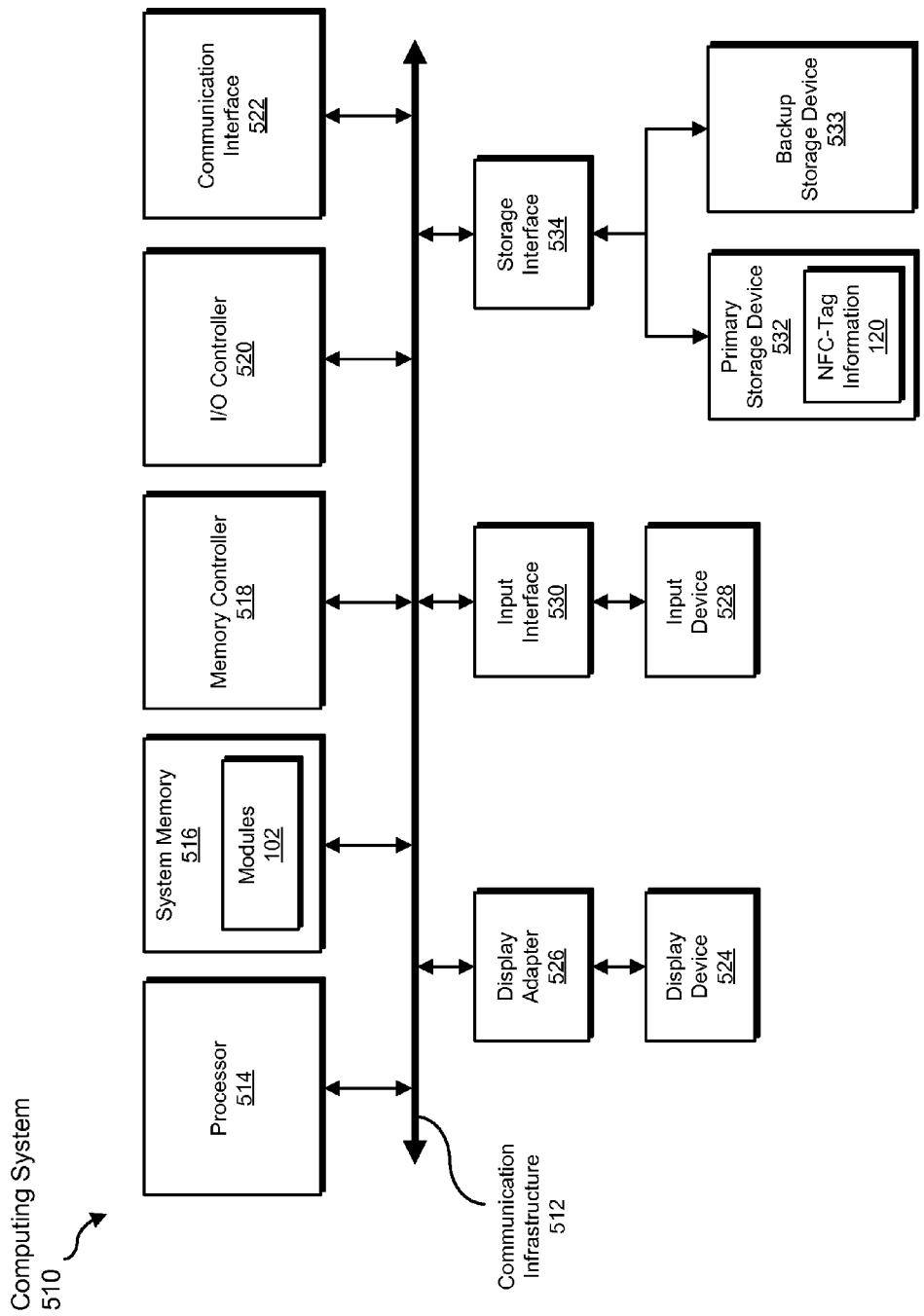
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, NFC-tag information 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
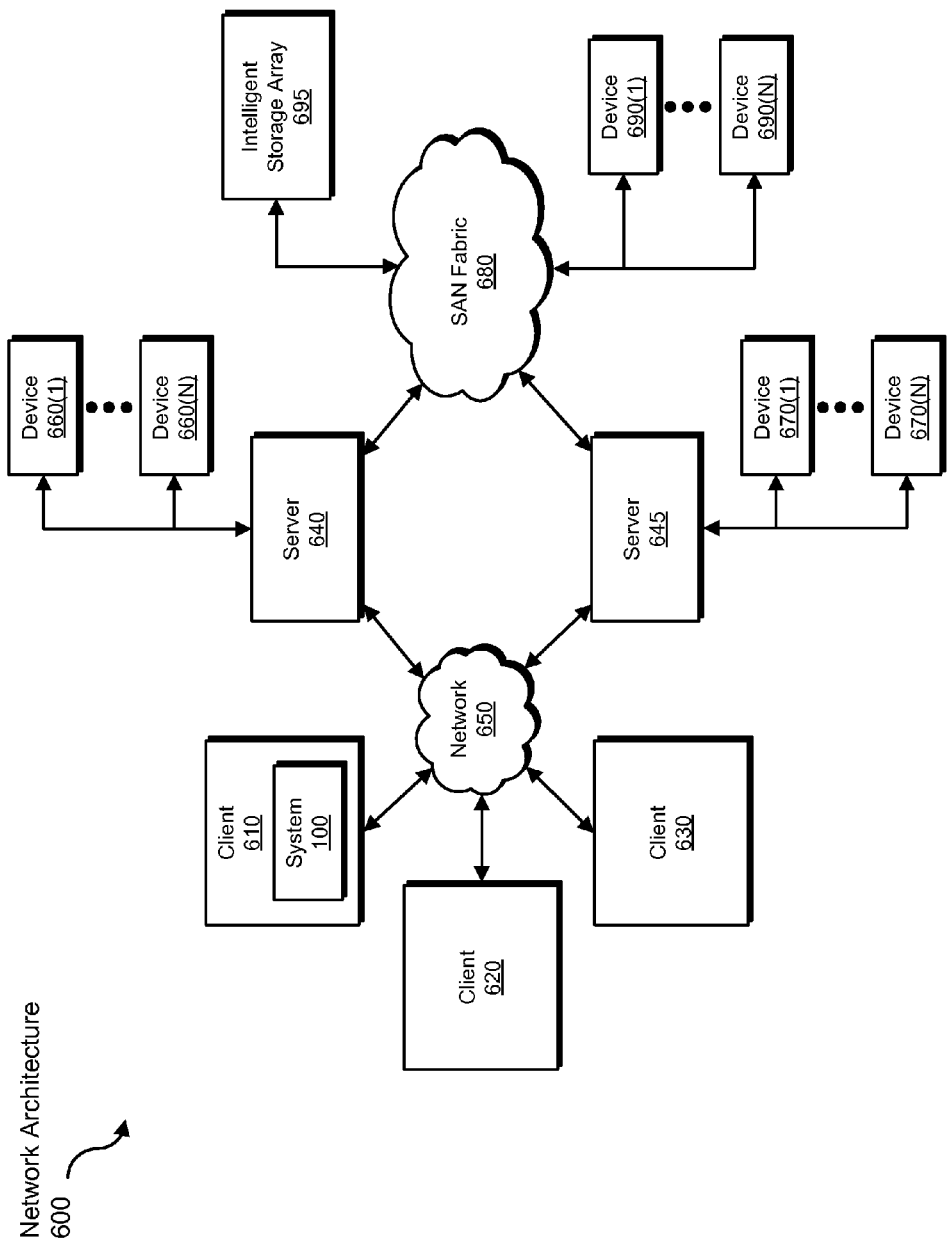
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for warning mobile device users about potentially malicious Near Field Communication (NFC) tags.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an NFC message to be transformed, transform the NFC message, output a result of the transformation to determine whether the NFC message includes potentially malicious content, use the result of the transformation to warn mobile device users against scanning the corresponding NFC tag, and store the result of the transformation to a remote server. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for warning mobile device users about potentially malicious Near Field Communication (NFC) tags, at least a portion of the method being performed by a computing device comprising at least one processor, the method comprising:
   prior to a mobile device scanning at least one NFC tag, obtaining, by the mobile device from a remote server, NFC-tag information that identifies:
      a geo-location of the NFC tag;
      a result of at least one malware analysis performed on an NFC message received by another mobile device from the NFC tag via NFC transmission;
   determining, based at least in part on the result of the malware analysis performed on the NFC message, that the NFC tag includes potentially malicious content;
   determining, based at least in part on the geo-location of the NFC tag, that the mobile device is located in proximity of the NFC tag;
   in response to determining that the mobile device is located in the proximity of the NFC tag, providing an alert that warns a user of the mobile device against scanning the NFC tag due at least in part to the potentially malicious content included in the NFC tag.

2. The method of claim 1, wherein the NFC-tag information further identifies:
   a geo-location of at least one additional NFC tag;
   a result of at least one malware analysis performed on the additional NFC tag;
   further comprising:
      determining, based at least in part on the result of the malware analysis performed on the additional NFC tag, that the additional NFC tag does not include malicious content;
      determining, based at least in part on the geo-location of the additional NFC tag, that the mobile device is located in proximity of the additional NFC tag;
      in response to determining that the mobile device is located in the proximity of the additional NFC tag, providing an alert that notifies the user of the mobile device that the additional NFC tag is safe to scan since the additional NFC tag does not include malicious content.

3. The method of claim 1, further comprising:
   receiving, by the mobile device, an NFC message via NFC transmission from an additional NFC tag located in proximity of the mobile device;
   performing at least one malware analysis on the NFC message received from the additional NFC tag;
   providing, to the remote server, at least one result of the malware analysis performed on the NFC message received from the additional NFC tag to enable the remote server to distribute the result of the malware analysis to at least one additional mobile device.

4. The method of claim 3, wherein:
   performing the malware analysis on the NFC message comprises generating a hash of the NFC message;
   providing the result of the malware analysis comprises providing, to the remote server, the hash of the NFC message to enable the remote server to monitor the NFC tag based at least in part on the hash.

5. The method of claim 1, further comprising:
   receiving, by the mobile device, an NFC message via NFC transmission from an additional NFC tag located in proximity of the mobile device;
   identifying a computing payload within the NFC message received from the additional NFC tag;
   providing, to the remote server, the computing payload identified within the NFC message to enable the remote server to:
      perform at least one malware analysis on the computing payload identified within the NFC message;
      distribute at least one result of the malware analysis performed on the NFC message to at least one additional mobile device.

6. The method of claim 5, wherein the computing payload comprises at least one of:
   an executable;
   a uniform resource locator that identifies content stored on a remote device.

7. The method of claim 1, wherein the NFC-tag information further identifies:
   an additional geo-location where at least one additional NFC tag was previously scanned by an additional mobile device;
   a hash of an NFC message received by the additional mobile device from the additional NFC tag;
   further comprising determining that the additional NFC tag has been replaced by another NFC tag at the additional geo-location by:
      receiving, by the mobile device, an NFC message via NFC transmission from the other NFC tag currently located at the additional geo-location;

generating a hash of the NFC message received from the other NFC tag currently located at the additional geo-location;
comparing the hash of the NFC message received from the other NFC tag currently located at the additional geo-location with the hash of the NFC message received from the additional NFC tag;
determining, based at least in part on the comparison, that the hash of the NFC message received from the other NFC tag currently located at the additional geo-location differs from the hash of the NFC message received from the additional NFC tag.

8. The method of claim 7, wherein the NFC-tag information further identifies:
a result of at least one malware analysis performed on the additional NFC tag;
a timestamp used to identify a period of validity for the malware analysis performed on the additional NFC tag;
further comprising, prior to receiving the NFC message from the other NFC tag currently located at the additional geo-location:
determining, based at least in part on the timestamp used to identify the period of validity, that the result of the malware analysis performed on the additional NFC tag is still valid;
in response to determining that the result of the malware analysis performed on the additional NFC tag is still valid, enabling the mobile device to scan the other NFC tag at the additional geo-location.

9. The method of claim 7, further comprising:
performing at least one malware analysis on the NFC message received from the other NFC tag currently located at the additional geo-location;
providing, to the remote server, at least one result of the malware analysis performed on the NFC message currently located at the additional geo-location to enable the remote server to distribute the result of the malware analysis to at least one other mobile device.

10. The method of claim 7, further comprising:
identifying a computing payload within the NFC message received from the other NFC tag currently located at the additional geo-location;
providing, to the remote server, the computing payload identified within the NFC message to enable the remote server to:
perform at least one malware analysis on the computing payload identified within the NFC message;
distribute at least one result of the malware analysis performed on the computing payload to at least one other mobile device.

11. The method of claim 1, wherein the result of the malware analysis performed on the NFC message comprises a result of at least one malware analysis performed on a duplicate of the NFC message stored within an additional instance of the NFC tag located at an additional geo-location.

12. A system for warning mobile device users about potentially malicious Near Field Communication (NFC) tags, the system comprising:
at least one processor of a mobile device configured to execute:
an obtainment module that obtains, prior to the mobile device scanning at least one NFC tag, NFC-tag information from a remote server that identifies:
a geo-location of the NFC tag;
a result of at least one malware analysis performed on an NFC message received by another mobile device from the NFC tag via NFC transmission;
a determination module that:
determines, based at least in part on the result of the malware analysis performed on the NFC message, that the NFC tag includes potentially malicious content;
determines, based at least in part on the geo-location of the NFC tag, that the mobile device is located in proximity of the NFC tag;
a provisioning module that provides, in response to the determination that the mobile device is located in the proximity of the NFC tag, an alert that warns a user of the mobile device against scanning the NFC tag due at least in part to the potentially malicious content included in the NFC tag.

13. The system of claim 12, wherein:
the NFC-tag information further identifies:
a geo-location of at least one additional NFC tag;
a result of at least one malware analysis performed on the additional NFC tag;
the determination module further:
determines, based at least in part on the result of the malware analysis performed on the additional NFC tag, that the additional NFC tag does not include malicious content;
determines, based at least in part on the geo-location of the additional NFC tag, that the mobile device is located in proximity of the additional NFC tag;
the provisioning module further provides, in response to the determination that the mobile device is located in the proximity of the additional NFC tag, an alert that notifies the user of the mobile device that the additional NFC tag is safe to scan since the additional NFC tag does not include malicious content.

14. The system of claim 12, wherein:
the processor of the mobile device is further configured to execute:
a reception module that receives an NFC message via NFC transmission from an additional NFC tag located in proximity of the mobile device;
an analysis module that performs at least one malware analysis on the NFC message received from the additional NFC tag;
the provisioning module further provides, to the remote server, at least one malware analysis performed on the NFC message received from the additional NFC tag to enable the remote server to distribute the result of the malware analysis to at least one additional mobile device.

15. The system of claim 14, wherein:
the processor of the mobile device is further configured to execute a hashing module that generates a hash of the NFC message;
the provisioning module further provides, to the remote server, the hash of the NFC message to enable the remote server to monitor the additional NFC tag based at least in part on the hash.

16. The system of claim 12, wherein:
the processor of the mobile device is further configured to execute:
a reception module that receives an NFC message via NFC transmission from an additional NFC tag located in proximity of the mobile device;
an identification module that identifies a computing payload within the NFC message received from the additional NFC tag;

the provisioning module further provides, to the remote server, the computing payload identified within the NFC message to enable the remote server to:
  perform at least one malware analysis on the computing payload identified within the NFC message;
  distribute at least one result of the malware analysis performed on the NFC message to at least one additional mobile device.

17. The system of claim 16, wherein the computing payload comprises at least one of:
  an executable;
  a uniform resource locator that identifies content stored on a remote device.

18. The system of claim 12, wherein the NFC-tag information further identifies:
  an additional geo-location where at least one additional NFC tag was previously scanned by an additional mobile device;
  a hash of an NFC message received by the additional mobile device from the additional NFC tag;
  further comprising:
    a reception module that receives an NFC message via NFC transmission from the other NFC tag currently located at the additional geo-location;
    a hashing module that generates a hash of the NFC message received from the other NFC tag currently located at the additional geo-location;
  wherein the determination module further determines that the additional NFC tag has been replaced by another NFC tag at the additional geo-location by:
    comparing the hash of the NFC message received from the other NFC tag currently located at the additional geo-location with the hash of the NFC message received from the additional NFC tag;
    determining, based at least in part on the comparison, that the hash of the NFC message received from the other NFC tag currently located at the additional geo-location differs from the hash of the NFC message received from the additional NFC tag.

19. The system of claim 18, wherein:
the NFC-tag information further identifies:
  a result of at least one malware analysis performed on the additional NFC tag;
  a timestamp used to identify a period of validity for the malware analysis performed on the additional NFC tag;
the determination module further determines, based at least in part on the timestamp used to identify the period of validity, that the malware analysis performed on the additional NFC tag is still valid;
the provisioning module further enables the mobile device to scan the other NFC tag at the additional geo-location in response to the determination that the malware analysis performed on the additional NFC tag is still valid.

20. A non-transitory computer-readable-storage medium comprising one or more computer-executable instructions that, when executed by at least one processor of a mobile device, cause the mobile device to:
  prior to the mobile device scanning at least one NFC tag, obtain, from a remote server, NFC-tag information that identifies:
    a geo-location of the NFC tag;
    a result of at least one malware analysis performed on an NFC message received by another mobile device from the NFC tag via NFC transmission;
  determine, based at least in part on the result of the malware analysis performed on the NFC message, that the NFC tag includes potentially malicious content;
  determine, based at least in part on the geo-location of the NFC tag, that the mobile device is located in proximity of the NFC tag;
  in response to determining that the mobile device is located in the proximity of the NFC tag, providing an alert that warns a user of the mobile device against scanning the NFC tag due at least in part to the potentially malicious content included in the NFC tag.

\* \* \* \* \*